March 17, 1959
J. A. OLSEN
2,877,950
GRAPHIC INSTRUMENTS
Filed Sept. 27, 1955
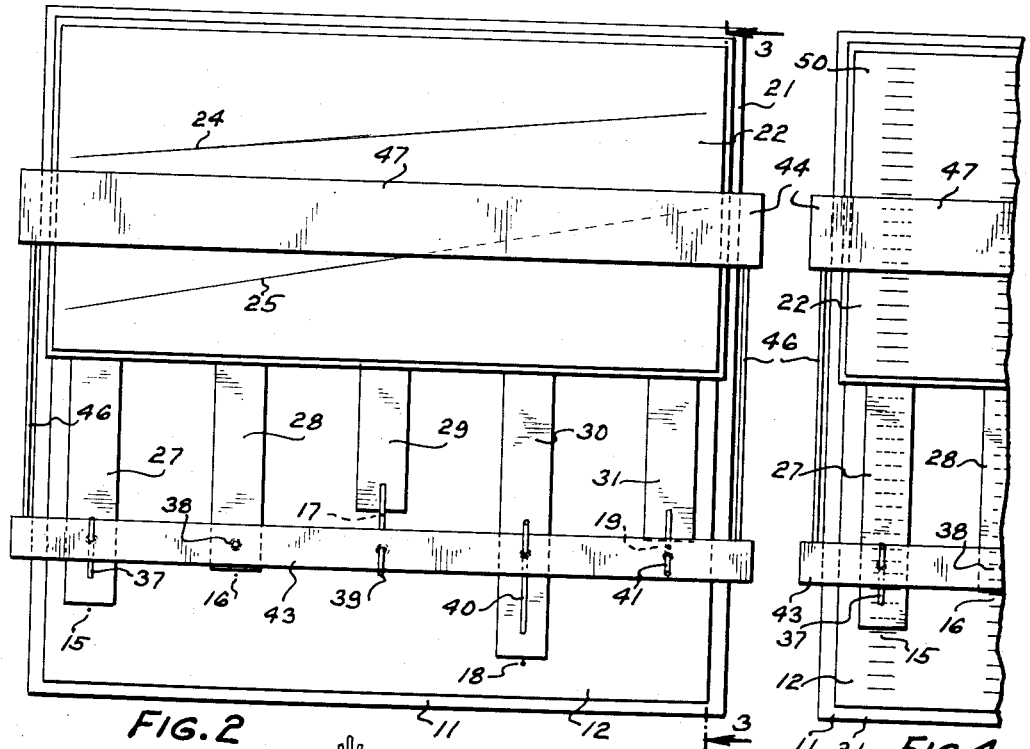
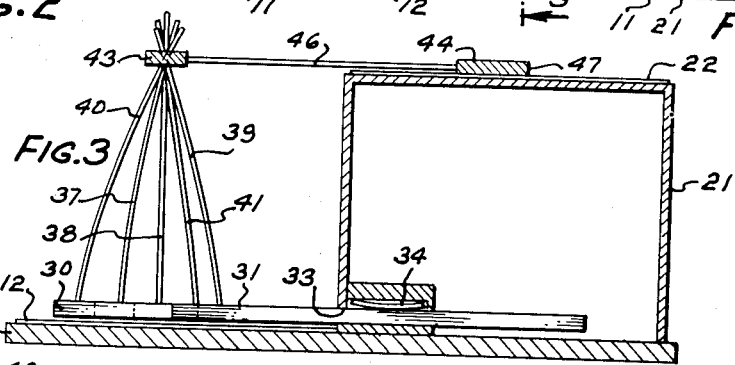
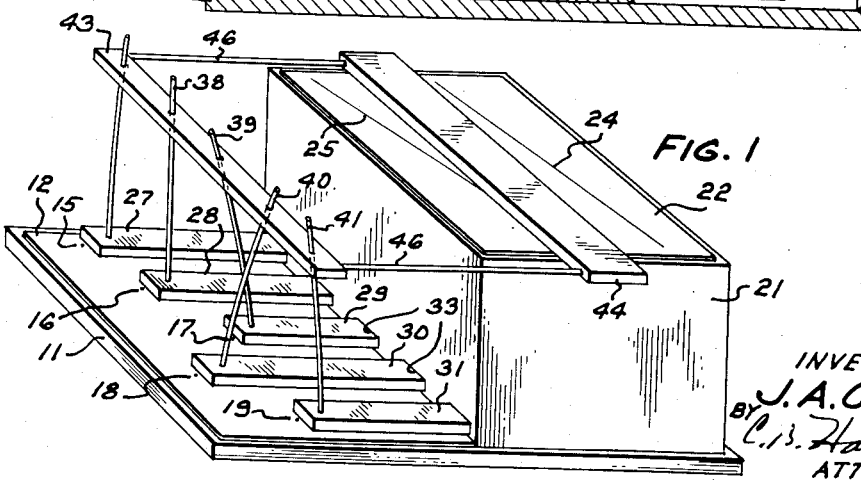
INVENTOR
J. A. OLSEN
BY C. B. Hamilton
ATTORNEY

United States Patent Office 2,877,950
Patented Mar. 17, 1959

2,877,950

GRAPHIC INSTRUMENTS

John A. Olsen, Winston-Salem, N. C., assignor to Western Electric Company, Incorporated, New York, N. Y., a corporation of New York Application September 27, 1955, Serial No. 536,965

2 Claims. (Cl. 235—61)

This invention relates to graphic instruments and more particularly to instruments for determining the best straight line through a number of test points.

An object of this invention is to provide a device for determining the best straight line through a number of test points without recourse to the usual graphical or mathematical means.

Another object of this invention is to provide a device having a resiliently supported member which automatically adjusts its location to move a straight edge into a position which indicates the best straight line through a number of test points.

A further object of this invention is to provide a device for determining the best straight line through a number of test points and whether this best straight line falls within predetermined limits.

One embodiment of the present invention may include a base for supporting a card having a plurality of test points through which the best straight line is to be determined. A plurality of bars slidably mounted on the base are provided with vertical wire springs which engage a floating member spaced above the base whereby, when the ends of the slidable bars are moved into alignment with corresponding points on the test card, the vertical wire springs urge the floating member into a position parallel to the best straight line through the test points. A straight edge secured to the floating member and moved by it is positioned on a control card supported above the base and corresponding to the test card whereby the best straight line will be indicated on the control card by the straight edge. Limit lines may be provided on the control card to determine whether the data represented by the best straight line falls within these limits and is acceptable.

Other objects and advantages of the invention will become apparent by reference to the following detailed description and the accompanying drawing illustrating a preferred embodiment of the invention, in which—

Fig. 1 is a perspective view of the device showing the bars set to predetermined points on the test chart;

Fig. 2 is a plan view of the device showing the wire springs acting on the floating member to move the straight edge to a position representing the best straight line through a plurality of test points;

Fig. 3 is a vertical section of the disclosure of Fig. 2 taken on line 3—3 thereof and showing the springs which hold the bars when they are set to points on the test chart; and Fig. 4 is a fragmentary plan view of the device showing a graduated test chart mounted on the device whereby when the bars are set to graduations representing test points the best straight line will be indicated on another chart mounted on the housing of the device.

Referring now in detail to the drawing, a base 11 is shown supporting a test chart 12 upon which are inscribed test points 15, 16, 17, 18 and 19 representing data taken from a test run of some machine or device (not shown). A housing 21 secured to the base 11 supports a control card 22 bearing limit lines 24 and 25 (Figs. 1 and 2) between which the best straight line through the test points must fall if the data represented by the points 15—19 is to be acceptable.

A plurality of horizontal bars 27, 28, 29, 30 and 31 are slidably mounted in apertures 33 (Fig. 3) in the housing 21 and are spaced slightly above the chart 12 whereby the bars 27, 28, 29, 30 and 31 can be manually moved until their ends are in alignment with the points 15, 16, 17, 18 and 19, respectively. Leaf pressure springs 34 (Fig. 3) in the apertures 33 engage the bars 27—31 to hold them in whatever positions they are moved to. A plurality of vertical wire springs 37, 38, 39, 40 and 41 rigidly secured to the bars 27, 28, 29, 30 and 31, respectively, extend upward through a thin flat member 43 whereby it is floatingly supported by the wire springs 37—41 in a position slightly higher than the control card 22 mounted on the housing 21. A straight edge 44 resting on the control card 22 supported on the housing 21 is connected to the floating member 43 by a pair of rods 46 whereby the straight edge 44 moves across the card 22 as the floating member 43 is moved by the vertical wire springs 37—41 as controlled by the positions of bars 27—31. If an edge 47 (Figs. 2 and 3) of the straight edge 44 falls between the limit lines 24 and 25 the data represented by the test points 15—19 is acceptable.

In operation, the test chart 12 bearing the test points 15, 16, 17, 18 and 19 is placed on the base 11 beneath the bars 27, 28, 29, 30 and 31 whereupon the bars are manually moved until their ends are in alignment with the test points, respectively. The bars 27—31 are held in these positions by the springs 34 mounted in the apertures 33 in the housing 21. This will cause distortion of some or all of the wire springs 37—41 from their vertical positions, unless the test points 15—19 are in a straight line. Since each spring 37—41 tends to return to its normal vertical position the floating member 43 will be urged to a position where the forces applied thereto by the springs 37—41 are in equilibrium, thereby moving the straight edge 44 on the control card 22. A line taken on the card 22 along the edge 47 of the straight edge 44 is the best straight line through the test points 15—19. Therefore, if the edge 47 falls between the limit lines 24 and 25 the data represented by the points 15—19 is acceptable.

If it is desirable to reproduce the best straight line through the points 15—19, a chart 50 (Fig. 4) corresponding to the test chart 12 is used on the housing 21 instead of the control card 22. After the bars 27, 28, 29, 30 and 31 are set to the points 15, 16, 17, 18 and 19, respectively, a line is drawn on the chart 50 along the edge 47 of the straight edge 44 thereby recording the best straight line on the chart 50. The test chart 12 may be graduated as illustrated in Fig. 4 whereby the bars 27—31 can be set to graduations representing the test points 15—19 thereby rendering it unnecessary to plot the points 15—19 on the test chart 12.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for determining the best straight line through a plurality of points on a chart; comprising a base for supporting a test chart having a plurality of points through which the best straight line is to be determined; a plurality of bars mounted above the test chart and having resilient elements extending upward; said bars being movable into alignment with the points on the test chart; a floating member secured to the upper ends of the resilient elements whereby when the ends of the bars are aligned with the points on the test chart the resilient elements urge the floating member into a position indicating the best straight line through the points; a second chart supported above the base; and a straight edge movable on the second chart and connected to the floating member whereby when the floating member is moved into position indicating the best straight line through the points on the test chart, the straight edge is moved into a like position on the second chart.

2. A device for determining the best straight line through a plurality of points on a chart; comprising a base for supporting a first chart having a plurality of points thereon; an apertured housing secured to the base for supporting above the base a second chart corresponding to the first chart; a plurality of bars slidably mounted in the apertures in the housing above the points on the first chart whereby the ends of the bars can be moved into alignment with said points; means mounted in the apertures in the housing for holding the bars in alignment with the points; a plurality of vertical wire springs secured to the bars; a floating member secured to the upper ends of the wire springs whereby it will be urged by the wire springs into a position indicating the best straight line through the points on the first chart when the ends of the bars are aligned with said points; and a straight edge movable on the second chart and connected to the floating member whereby when the floating member is moved to a position indicating the best straight line through the points on the first chart, the straight edge is moved to a like position on the second chart.

References Cited in the file of this patent
UNITED STATES PATENTS

| | | |
|---|---|---|
| 2,551,440 | Kreitner | May 11, 1951 |
| 2,620,130 | Slaugh et al. | Dec. 2, 1952 |